US011018826B2

(12) United States Patent
Sun et al.

(10) Patent No.: US 11,018,826 B2
(45) Date of Patent: May 25, 2021

(54) METHODS AND APPARATUSES FOR TRANSMITTING AND RECEIVING REFERENCE SIGNALS

(71) Applicant: Samsung Electronics Co., Ltd., Suwon-si (KR)

(72) Inventors: Pengfei Sun, Beijing (CN); Bin Yu, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 15/361,910

(22) Filed: Nov. 28, 2016

(65) Prior Publication Data

US 2017/0155479 A1    Jun. 1, 2017

(30) Foreign Application Priority Data

Dec. 1, 2015 (CN) .......................... 201510866670.6

(51) Int. Cl.
*H04L 5/00* (2006.01)
*H04B 7/0417* (2017.01)
(Continued)

(52) U.S. Cl.
CPC .......... *H04L 5/005* (2013.01); *H04B 7/0417* (2013.01); *H04B 7/0691* (2013.01);
(Continued)

(58) Field of Classification Search
None
See application file for complete search history.

(56) References Cited

U.S. PATENT DOCUMENTS

2010/0310005 A1* 12/2010 Takagi .................. H04B 7/061
375/295
2011/0051618 A1    3/2011 Li et al.
(Continued)

FOREIGN PATENT DOCUMENTS

| CN | 104285405 A | 1/2015 |
| WO | 2015/026196 A1 | 2/2015 |
| WO | 2015/115819 A1 | 8/2015 |

OTHER PUBLICATIONS

Acar Yusuf et al, "Channel estimation for spatial modulation orthogonal frequency division multiplexing systems", 2015 9th International Conference on Application of Information and Communication Technologies (AICT), IEEE, Oct. 14, 2015 (Oct. 14, 2015), pp. 382-385, XP032818310, DOI: 10.1109/ICAICT.2015.7338584 ISBN: 978-1-4673-6855-1.
(Continued)

*Primary Examiner* — Mariela Vidal Carpio
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for transmitting reference signals is provided. In the method, a transmitting apparatus inserts at least one physical resource block for reducing reference signal overheads between adjacent first physical resource (Continued)

blocks, and then transmits first physical resource blocks and the at least one physical resource block for reducing the reference signal overheads.

12 Claims, 13 Drawing Sheets

(51) Int. Cl.
    *H04L 25/02*    (2006.01)
    *H04B 7/06*     (2006.01)
    *H04W 72/04*    (2009.01)

(52) U.S. Cl.
    CPC ........ *H04L 5/0023* (2013.01); *H04L 25/0232* (2013.01); *H04W 72/042* (2013.01); *H04W 72/0446* (2013.01); *H04W 72/0453* (2013.01)

(56) References Cited

U.S. PATENT DOCUMENTS

| | | | | |
|---|---|---|---|---|
| 2011/0243262 A1* | 10/2011 | Ratasuk | .............. | H04L 5/003 375/260 |
| 2011/0317748 A1 | 12/2011 | Li et al. | | |
| 2013/0044701 A1* | 2/2013 | Koorapaty | .......... | H04L 27/2611 370/329 |
| 2013/0294333 A1 | 11/2013 | Chen et al. | | |
| 2014/0064213 A1* | 3/2014 | Guo | .................. | H04L 5/0048 370/329 |
| 2014/0211740 A1* | 7/2014 | Berggren | .............. | H04L 5/0048 370/329 |
| 2014/0254504 A1* | 9/2014 | Bashar | .................. | H04L 5/0048 370/329 |
| 2015/0036609 A1* | 2/2015 | Kim | ...................... | H04W 56/00 370/329 |
| 2015/0181570 A1* | 6/2015 | Sorrentino | ............ | H04W 76/27 370/329 |
| 2015/0312009 A1* | 10/2015 | Nissila | ................ | H04L 27/2602 370/329 |
| 2016/0164581 A1* | 6/2016 | Kim | ..................... | H04W 72/046 370/329 |
| 2016/0191215 A1* | 6/2016 | Lee | ......................... | H04L 5/001 375/260 |
| 2016/0277065 A1* | 9/2016 | Xie | ........................ | H04B 1/7143 |
| 2018/0049192 A1* | 2/2018 | Beale | ................... | H04B 7/0617 |
| 2018/0076866 A1* | 3/2018 | Chen | .................... | H04L 1/0009 |
| 2018/0278312 A1* | 9/2018 | Frenne | ................ | H04B 7/0626 |

OTHER PUBLICATIONS

Lakshmi Narasimhan T et al, "Generalized Spatial Modulation in Large-Scale Multiuser MIMO Systems", IEEE Transactions on Wireless Communications, IEEE Service Center, Piscataway, NJ, US, vol. 14, No. 7, Jul. 1, 2015 (Jul. 1, 2015), pp. 3764-3779, XP011662737, ISSN: 1536-1276, DOI: 10.1109/TWC.2015.2411651.

European Search Report with Information Search Strategy dated Nov. 23, 2018, issued in European Patent Application No. 16871022.6.

Chinese Office Action dated Oct. 12, 2020, issued in Chinese Application No. 201510866670.6.

\* cited by examiner

METHODS AND APPARATUSES FOR TRANSMITTING AND RECEIVING REFERENCE SIGNALS

CROSS-REFERENCE TO RELATED APPLICATION(S)

This application claims the benefit under 35 U.S.C. § 119(a) of a Chinese patent application filed on Dec. 1, 2015 in the Chinese Intellectual Property Office and assigned Serial number 201510866670.6, the entire disclosure of which is hereby incorporated by reference.

TECHNICAL FIELD

The present disclosure relates to radio communications. More particularly, the present disclosure relates to methods and apparatuses for transmitting and receiving reference signals.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Rapid development of the information industry, especially demands for increase of mobile internets and Internet of things (IoT), brings an unprecedented challenge to future mobile communication techniques. For example, according to a report of the international telecommunication union (ITU), ITU-R M. [IMT. BEYOND 2020. TRAFFIC], it is estimated that by year 2020, compared to that in year 2010 (using fourth generation of mobile telecommunication standard (4G) as a comparison), the number of mobile services will increase nearly 1000 times, and the number of user device connections will be more than 170 billion. As a massive number of IoT devices gradually penetrate into the mobile communication network, the number of connected devices will be even more astonishing. To meet the unprecedented challenge, the communication industry and academia have developed research on a wide fifth generation of mobile telecommunication (5G) technique for year 2020. At present, in a report of the ITU, ITU-R M. [IMT. VISION], the framework and overall objectives of the future 5G technique are discussed, in which a vision of demands, usage scenarios, and various important performance indicators of 5G are described in detail. Aiming at new demands in 5G, a report of the ITU, ITU-R M. [IMT.FUTURE TECHNOLOGY TRENDS], provides related information on trends of the 5G technique, intended to solve problems in order to significantly improve system throughput, user experience consistency, and scalability to support IoT, latency, energy efficiency, costs, network flexibility, support for new merging services, and flexible spectrum usage.

Multiple-input multiple-output (MIMO) technique is an important measure to improve system spectral efficiency. Since the multi-antenna technique can efficiently improve system data rates, and improve system link stability, it has been widely used in fields of broadcasting videos and audios and in domestic communication systems, e.g., a long term evolution (LTE) system corresponding to an evolved universal terrestrial radio access (E-UTRA) protocol formulated by the 3rd generation partnership project (3GPP), the second generation digital video broadcasting (DVB) in Europe, and IEEE802.16 world interoperability for microwave access (WiMAX). The MIMO technique may establish communication links between different antennas at a transmitting end and at a receiving end, and may be able to provide spatial diversity gains and spatial multiplexing gains for a system. By transmitting same data on different links, the MIMO technique improves reliability of data transmission, so as to obtain diversity gains. In addition, by transmitting different data on different links, the MIMO technique is able to improve system spectral efficiency and further improve data transmission rates, without increasing transmission bandwidths. By using channel state information of the transmitting end, the MIMO technique is also able to encode to simultaneously serve multiple user equipments (UEs) using a same frequency, to increase spectral efficiency of the overall system. At present, as a key technique, the MIMO technique is also able to support mobile broadband (MBB) service requirements of 4G. In 5G, the requirements for spectral efficiency, energy efficiency, and data rates are further increased, and thus, the traditional MIMO technique (e.g., for 4G) will have difficulties meeting the requirements of highly increased data rates. Therefore, an evolved MIMO technique, massive MIMO, gains concerns of the academia and industry. By configuring antennas, the number of which is far more than the number of UEs at a transmitting end, the massive MIMO technique can achieve larger array processing gains (slimmer beams), and at the same time achieve larger spatial degrees of freedom, and is able to totally differentiate UEs using a simple linear operation, which further improves spectral efficiency and energy efficiency. However, in actual usage scenarios, the MIMO technique and the massive MIMO technique also encounter some problems.

For example, the following problems or difficulties may result.

1. Whether or not the MIMO technique is effective and reliable depends on whether or not a transmitting end can obtain accurate channel state information. If channel state information at the transmitting end is not accurate enough, it will lead to significant decrease of system gains. At present, the existing MIMO technique relies on reference signal-based channel estimation and feedback. However, when the number of antennas increases, overheads caused by the reference signals and feedback will heavily decrease system frequency efficiency.

2. Synchronization between antennas is strictly required.

3. The receiving end needs to deal with inter-antenna interference.

4. Though the multiple-UE MIMO technique is able to improve overall spectral efficiency of a cell, it is helpless for improving spectral efficiency of a single UE.

As a branch of the MIMO technique, spatial modulation (SM) technique has gained popularity in academia in recent years. The SM technique uses a part of information bits for selecting transmitting antennas, and each transmission only uses a single antenna. By using antenna indexes as additional carriers for transmission of information, the SM technique constructs three dimensional constellations based on traditional two dimensional constellations, and achieves higher spectral efficiency than that of a single-antenna system. Meanwhile, the SM technique also solves some issues that exist in the traditional MIMO technique. For examples, since each transmission only uses a single antenna, in the SM technique, a receiving end does not need to perform complicated synchronization between antennas and/or eliminate inter-link interference, which largely simplifies processing at the receiving end. Thus, the SM technique can increase spectral efficiency of a single UE, which is more suitable for scenarios where data rates of a single UE need to be increased. In the SM technique, since a transmitting end does not need to perform pre-coding, therefore, the receiving end does not need to provide feedback. Additionally, since the transmitting end needs only one radio link, this dramatically decreases overhead at the transmitting end. Although the multi-carrier-based SM technique has fewer advantages than that of a single radio link, but allocation of two-dimensional (2D) time-frequency resources provides a higher degree of freedom for the system, and is more robust for frequency selective fading that is caused due to multi-path.

Because of its advantages, the SM technique has gained wide popularity in communication research. However, it still has many challenges when it is implemented in radio communication systems because of some of its inherent drawbacks. These challenges, yet to be solved, are still in study. One of the issues is reference signal design and channel estimation. By differentiating channel state information of different antennas arriving at the receiving end, the SM technique differentiates indexes of transmitting antennas, and therefore, in the SM technique, the receiving end needs to know channel state information. According to a scheme of training reference signals and channels in an existing standard, for example, in long term evolution-advance (LTE-A), a cell-specific reference signal (CRS) and a channel state information reference signal (CSI-RS) are able to support a MIMO system where a transmitting end is configured with 4-8 antennas, but, when there are too many antennas at the transmitting end, if a traditional RS design is used, relatively large overheads may occur, which causes a decrease of system spectral efficiency.

In summary, to improve competency of the multi-carrier SM technique in the 5G candidate technique, solutions to the problem of relatively large overheads of downlink reference signals in the SM technique are needed, to decrease overheads caused by downlink physical channel training in a multi-carrier spatial modulation (SM) system to improve system spectral efficiency.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, aspects of the present disclosure are to provide methods and apparatuses for effectively reducing training overheads, being able to reduce overheads caused by downlink physical channel training, and improving spectral efficiency of a system.

In an embodiment of the present disclosure, a method for transmitting reference signals is provided. The method includes inserting, by a transmitting apparatus, at least one physical resource block for reducing reference signal overheads between adjacent first physical resource blocks, and transmitting, by the transmitting apparatus, the first physical resource blocks and the at least one physical resource block for reducing the reference signal overheads.

In an embodiment of the disclosure, the at least one physical resource block for reducing the reference signal overheads is configured to reduce the reference signal overheads by at least one of: transmitting, by the transmitting apparatus, reference signals for a channel estimation on a first subset of links among transmission links; transmitting, by the transmitting apparatus, spatial modulation symbols on a second subset of links among the transmission links, dividing, by the transmitting apparatus, the at least one physical resource block for reducing the reference signal overheads into two parts of time-frequency resources, in which the transmission on the first subset of links and the transmission on the second subset of links are carried out on a same time-frequency resource, the first subset of links comprises at least one of all the transmission links, the second subset of links comprises at least one of all the transmission links, a first part of the time-frequency resources is used for a channel estimation update, and a second part of the time-frequency resources is used for a supplementary of the channel estimation update.

An embodiment of the present disclosure, may further include at least one of: transmitting, by the transmitting apparatus, preset locations of the first physical resource blocks and an insertion frequency for inserting the at least one physical resource block for reducing the reference signal overheads to a receiving apparatus, or transmitting, by the transmitting apparatus, locations of the first physical resource blocks and locations of the at least one physical resource block for reducing the reference signal overheads to the receiving apparatus.

An embodiment of the present disclosure may further include at least one of: receiving channel state information from the receiving apparatus, determining an insertion frequency of inserting the at least one physical resource block for reducing the reference signal overheads according to the channel state information, receiving indication information of indicating insertion of a first physical resource block from the receiving apparatus, inserting the first physical resource block between the at least one physical resource block for reducing the reference signal overheads, transmitting notification information to the receiving apparatus, or inserting the first physical resource block between a pair of the at least one physical resource block for reducing the reference signal overheads at a preset time interval.

In an embodiment of the present disclosure, the determining of the insertion frequency of inserting the at least one physical resource block for reducing the reference signal overheads according to the channel state information may include: in response to determining that a channel varies faster than a preset first threshold, using a first insertion frequency to insert the at least one physical resource block to reduce the reference signal overheads, and in response to determining that the channel varies slower than a preset second threshold, using a second insertion frequency to insert the at least one physical resource block to reduce the reference signal overheads, in which the first insertion frequency is smaller than or equal to the second insertion frequency.

In an embodiment of the present disclosure, a transmitting apparatus is provided. The apparatus includes an inserter or an inserting module and a transmitter or a transmitting module, in which the inserter is configured to insert at least one physical resource block for reducing reference signal overheads between adjacent first physical resource blocks, and the transmitter is configured to transmit the first physical resource blocks and the at least one physical resource block for reducing the reference signal overheads.

In an embodiment of the present disclosure, a method for receiving reference signals is provided. The method includes receiving, by a receiving apparatus, location information of first physical resource blocks and physical resource blocks for reducing reference signal overheads, performing, by the receiving apparatus, a channel estimation using the first physical resource blocks and the physical resource blocks for reducing the received reference signal overheads, and performing, by the receiving apparatus, data detection according to a result of the channel estimation.

An embodiment of the present disclosure may further include deciding, by the receiving apparatus, whether to transmit indication information of indicating insertion of a first physical resource block to a transmitting apparatus according to the result of the channel estimation.

In an embodiment of the present disclosure, in response to the result of the channel estimation showing that a channel varies faster than a preset threshold, the receiving apparatus transmits the indication information of indicating insertion of the first physical resource block to the transmitting apparatus.

An embodiment of the present disclosure may further include: determining, by the receiving apparatus, an insertion of a first physical resource block from indication information received from a transmitting apparatus, incrementally detecting the first physical resource block, or incrementally detecting, by the receiving apparatus, the first physical resource block, after a preset time interval after the receiving apparatus transmits indication information for indicating insertion of the first physical resource block.

In an embodiment of the present disclosure, the preset time interval is determined according to at least one of following information a cell radius, processing rate of the transmitting apparatus, or the processing rate of the receiving apparatus.

In an embodiment of the present disclosure, a receiving apparatus is provided. The receiving apparatus may include a receiver or a receiving module, a channel estimator or a channel estimation module, and a data detector or a data detecting module, in which the receiver is configured to receive location information of first physical resource blocks and physical resource blocks for reducing reference signal overheads, the channel estimator is configured to perform a channel estimation using the first physical resource blocks and the physical resource blocks for reducing the reference signal overheads received; and the data detector is configured to perform data detection according to a channel estimation result.

In an embodiment of the present disclosure, the receiving apparatus further include an indicator or an indicating module, and the indicator may be configured to determine whether to transmit indication information of indicating insertion of a first physical resource block to a transmitting apparatus according to the channel estimation result.

In an embodiment of the present disclosure, a method for transmitting reference signals in a physical resource block for reducing reference signal overheads is provided. The method includes transmitting, by a transmitter or a transmitting apparatus, reference signals for a channel estimation on a first subset of links among transmission links, and transmitting, by the transmitter, spatial modulation (SM) symbols on a second subset of links among the transmission links, in which the transmitting of the reference signals for the channel estimation on the first subset of links and the transmitting of the reference signals for the channel estimation on the second subset of links are carried out on a same time-frequency resource, and the first subset of links includes at least one of all the transmission links, and the second subset of links includes at least one of all the transmission links.

In an embodiment of the present disclosure, the first subset of links and the second subset of links are not overlapped.

In an embodiment of the present disclosure, the transmitter is configured to use orthogonal resources to transmit the reference signals on the first subset of links, and the orthogonal resources include at least one of the following resources: time resources, frequency resources, or orthogonal code sequence resources.

An embodiment of the present disclosure may further include: receiving, by the transmitter, channel state information from the receiver, and determining, by the transmitter, numbers of links contained in the first sub-set of links and in the second sub-set of links.

An embodiment of the present disclosure may further include: determining that a channel varies faster than a preset first threshold, and in response thereof, the first subset of links and the second subset of links are configured to include a first link number, and in response to determining that the channel varies slower than a preset second threshold, and in response thereof the first subset of links and the second subset of links are configured to include a second link number, in which the first link number is smaller than the second link number.

In an embodiment of the present disclosure, a transmitting apparatus is provided. The apparatus includes a reference signal transmitter and a modulation symbol transmitter, in which the reference signal transmitter is configured to transmit reference signals for a channel estimation on a first subset of links among transmission links, the modulation symbol transmitter is configured to transmit spatial modulation (SM) symbols on a second subset of links among the transmission links, in which the reference signal transmitter and the modulation symbol transmitter are configured to transmit the reference signals and the SM symbols on a same time-frequency resource, and the first subset of links includes at least one of all the transmission links and the second subset of links comprises at least one of all the transmission links.

In an embodiment of the present disclosure, a method for receiving reference signals is provided. The method includes receiving first physical resource blocks and physical resource blocks for reducing reference signal overheads, obtaining a rough estimation of a current channel based on a received signal and preceding N channel estimation results of the first physical resource blocks, or an interpolation result of channel estimations of first physical resource blocks in preceding and following N1 frames, and extracting spatial modulation (SM) symbol transmission part, in which N is larger than or equal to 1, and N1 is larger than or equal to 1, performing SM detection for the obtained SM symbol transmission part to obtain an estimation of a transmission link index and an estimation of a data symbol, and updating a channel estimation of a corresponding link based on the estimation of the transmission link index, the estimation of the data symbol, a reference signal, and the received signal.

In an embodiment of the present disclosure, a receiving apparatus is provided. The receiving apparatus includes a data extractor or a data extracting module, a data detector or a data detecting module, and a channel estimator or a channel estimation module, in which the data extractor is configured to obtain a rough estimation of a current channel based on a received signal and preceding N channel estimation results of first physical resource blocks or an interpolation result of channel estimations of the first physical resource blocks in preceding and following N1 frames, and extract a spatial modulation (SM) symbol transmission part, in which N is larger than or equal to 1, and N1 is larger than or equal to 1, the data detector is configured to perform SM detection for the obtained SM symbol transmission part extracted by the data extractor, to obtain an estimation of a transmission link index and an estimation of a data symbol, and the channel estimator is configured to update a channel estimation of a corresponding link based on the estimation of the transmission link index and the estimation of the data symbol obtained by the data detector, a reference signal, and the received signal.

In an embodiment of the present disclosure, a method for transmitting reference signals in a physical resource block for reducing reference signal overheads is provided. The method includes dividing, by a transmitting apparatus, a time-frequency resource block for reducing the reference signal overheads into two parts of time-frequency resources, and configuring the transmitting apparatus to: use a first part of the time-frequency resources for a channel estimation update, and use a second part of the time-frequency resources for a supplementary of the channel estimation update.

In an embodiment of the present disclosure, the first part of time-frequency resources and the second part of time-frequency resources are not overlapped.

In an embodiment of the present disclosure, the transmitting apparatus only transmits spatial modulation (SM) symbols on the first part of the time-frequency resources.

An embodiment of the present disclosure, further includes counting, by the transmitting apparatus, the number of links used for transmitting SM symbols on the first part of the time-frequency resources and numbers of times of using the links, and deciding, by the transmitting apparatus, a set of links used for transmitting symbols on the second part of the time-frequency resources based on the counted number of the links and the counted numbers of the times of using the links.

An embodiment of the present disclosure further includes sorting, by the transmitting apparatus, numbers of times of using the links on the first part of the time-frequency resources in an ascending order, and selecting, by the transmitting apparatus, at least one link to transmit symbols on the second part of time-frequency resources according to an ascending order of the numbers of the times of using the links.

An embodiment of the present disclosure further includes deciding, by the transmitting apparatus, a size of the second part of the time-frequency resources based on channel state information fed back by the receiving apparatus, and informing the receiving apparatus.

In response to determining that a channel varies faster than a preset first threshold, the second part of the time-frequency resources is configured to use a first value, and in response to determining that the channel varies slower than a preset second threshold, the second part of the time-frequency resources is configured to use a second value, in which the first value is larger than the second value.

In an embodiment of the present disclosure, a transmitting apparatus is provided. The transmitting apparatus includes a resource divider or a resource dividing module and a resource allocator or a resource allocating module, in which the resource divider is configured to divide a time-frequency resource block used for a channel estimation into two parts of time-frequency resources, and the resource allocator is configured to use a first part of the time-frequency resources for a channel estimation update, and use a second part of the time-frequency resources for a supplementary of the channel estimation update.

An embodiment of the present disclosure discloses a method for receiving reference signals. The method includes performing spatial modulation (SM) detection for a received signal to obtain an estimation of a link index and an estimation of data symbols, and using the data symbols as reference signals to update a channel estimation result of the link index based on the received signal, the estimation of the link index, and the estimation of the data symbols.

An embodiment of the present disclosure discloses a receiving apparatus is provided. The apparatus includes a data detector or a data detecting module and a channel estimator or a channel estimation module, in which the data detector is configured to perform spatial modulation (SM) detection for a received signal to obtain an estimation of a link index and an estimation of data symbols, and the channel estimator is configured to use the data symbols as reference signals to update a channel estimation result of the link index based on the received signal, the estimation of the link index obtained by the data detector, and the estimation of the data symbols.

Thus, according to the technical aspects of various embodiments of the present disclosure, as described above, by inserting physical resource blocks for reducing reference signal overheads into conventional physical resource block transmissions, overheads caused by downlink physical channel training may be effectively reduced, and system spectral efficiency may be improved. Meanwhile, the technical aspects of various embodiments of the present disclosure are also applicable for traditional spatial modulation multi-carrier systems, and can reduce overheads caused by system downlink training, and can further improve system spectral efficiency.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
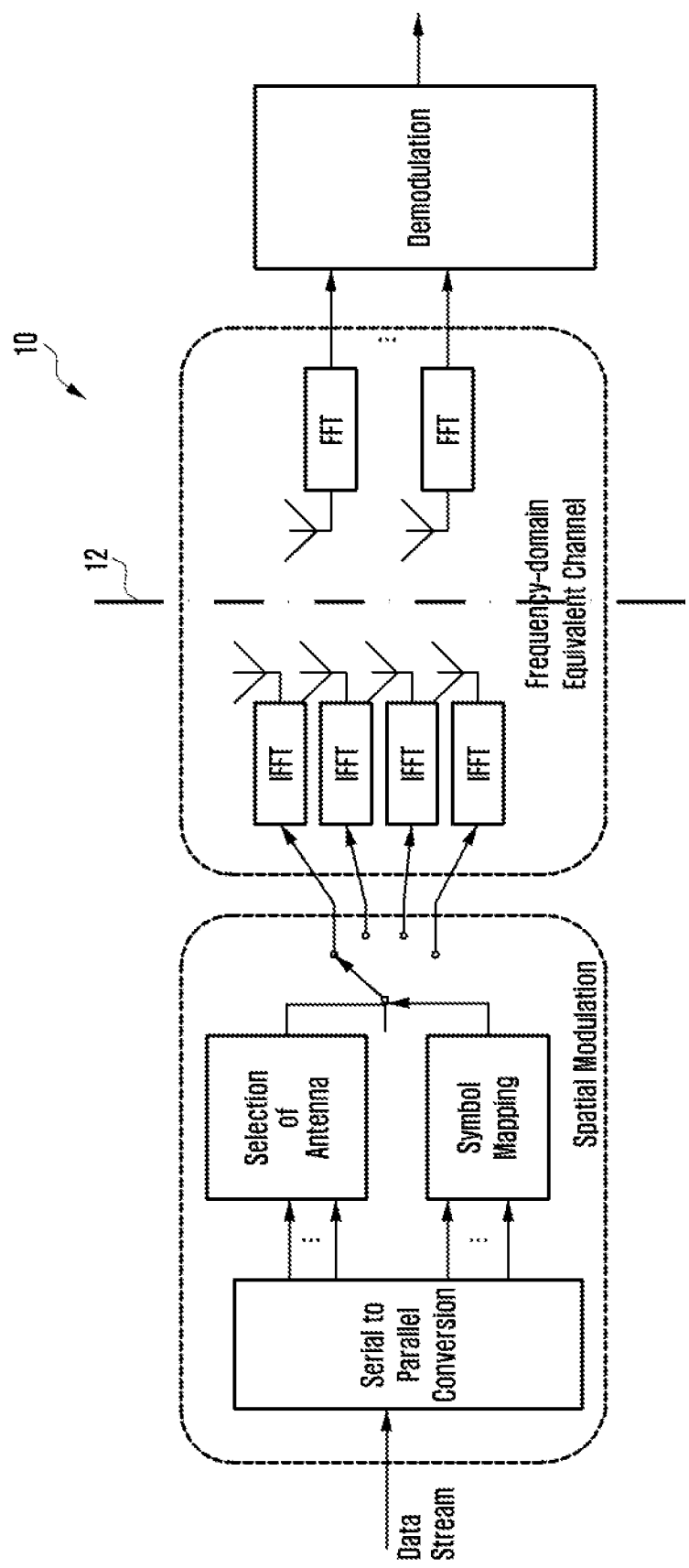
FIG. 1 is a block diagram of a multi-carrier spatial modulation (SM) system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Since a spatial modulation (SM) technique uses antenna indexes for transmitting data as additional information carriers, and it may achieve higher spectral efficiency than a single-antenna system under a same bandwidth. Compared to a traditional multi-antenna system, the SM technique has the following advantages: (1) since each data transmission uses only one of multiple transmitting antennas, thus, a receiving end does not need to perform synchronization between antennas; (2) since the technique is only applicable for using a single transmitting antenna, inter-link interference will not be generated, and a receiving end does not need to use a complicated equalization algorithm to eliminate inter-link interference; (3) since only a few radio channels are needed, the technique can significantly reduce energy costs generated due to the number of radio channels being relatively large (i.e., a SM system is a system that has a higher energy efficiency); and (4) even if the number of transmitting antennas is larger than the number of receiving antennas, the SM system can still work. In addition, same frequency efficiency may be realized through combinations of different numbers of antennas and modulation modes, and thus spatial modulation causes system parameters to be more flexible. Since a SM system combined with a multi-carrier technique such as orthogonal frequency division multiplexing (OFDM), performs spatial modulation for a frequency-domain equivalent multi-antenna channel containing multi-carrier modulation, actual physical channels, and multi-carrier demodulation, although the technique loses an advantage in the number of radio frequency channels being relatively small, it achieves larger degrees of freedom in resource allocation and pilot allocation, and has better compatibility with standards.

FIG. 1 is a block diagram 10 of a multi-carrier SM system according to the related art, in which the part on the left side of the dash-dot line 12 is a block diagram of a transmitting end, and the part on the right side is a block diagram of a receiving end. As shown in FIG. 1, assume that the number of transmitting antennas is N, and a modulation order is $Q=2^B$, where B is the number of bits that map to a symbol. A basic processing flow at the transmitting end is that a data stream transmitted is grouped every $\log_2 (NQ)=\log_2 (N)+B$ bits, in which first $\log_2 (N)$ bits decide a data stream index for transmitting data, and last B bits are mapped to a quadrature amplitude modulation (QAM) symbol. As an example, when N=2, and B=2, a mapping relationship between SM bits to SM symbols is shown as in Table 1. In table 1, an antenna index represents an index of a current antenna for transmitting data. In a transmitted bit sequence, the first bit is used to determine an antenna index, and the last two bits are used to decide a symbol to be transmitted. After SM symbols are obtained, an inverse fast Fourier transform (IFFT) is performed for all N data streams, to obtain data streams transmitted on the N transmitting antennas.

TABLE 1

Mapping Relationship of Bit-Symbol

| Bit Sequence | Antenna Index | Symbol |
| --- | --- | --- |
| 000 | 0 | $\frac{1}{\sqrt{2}}(-1-j)$ |
| 001 | 0 | $\frac{1}{\sqrt{2}}(-1+j)$ |
| 010 | 0 | $\frac{1}{\sqrt{2}}(1-j)$ |
| 011 | 0 | $\frac{1}{\sqrt{2}}(1+j)$ |
| 100 | 1 | $\frac{1}{\sqrt{2}}(-1-j)$ |
| 101 | 1 | $\frac{1}{\sqrt{2}}(-1+j)$ |
| 110 | 1 | $\frac{1}{\sqrt{2}}(1-j)$ |
| 111 | 1 | $\frac{1}{\sqrt{2}}(1+j)$ |

A block diagram of a spatial modulation receiving end using the OFDM technique is shown on the right side of the dash-dot line in FIG. 1, and it is assumed that the receiving end is configured with M antennas. After receiving signals, the receiving end performs a fast Fourier transform (FFT) for a data stream on each receiving antenna, to obtain frequency-domain signals. Assuming that a frequency-domain equivalent channel matrix which includes transmitting end IFFT, actual physical channels, and receiving end FFT, is $H \in C^{M \times N}$, then a corresponding channel model may be expressed as:

$$y=Hx+n$$

$y \in C^{M \times 1}$ is a received vector after FFT, $x=e_j s_j \in C^{N \times 1}$ is a spatial modulation symbol vector transmitted, and $n \in C^{M \times 1}$ is a noise vector. In vector $e_j=[0, \ldots, 0, 1, 0, \ldots, 0]^T \in C^{N \times 1}$, only element i is 1, and the other elements are 0, which indicates that according to bits transmitted, only antenna i is used for data transmission. Symbol $s_j$ is a symbol selected from a constellation mapping symbol set, e.g., a quadrature amplitude modulation (QAM), pulse amplitude modulation (PAM), or phase shift keying (PSK) symbol set. Therefore, a received symbol may be expressed as:

$$y=h_i s_j+n$$

where, $h_i \in C^{M \times 1}$ is column i in the matrix H.

The receiving end detects a transmitted symbol using a maximum likelihood detection algorithm as follows:

$$\{\hat{i}, \hat{s}_j\} = \underset{i,s_j}{\operatorname{argmin}} \|y - h_i s_j\|^2$$

After an estimation of a transmitting antenna index, $\hat{i}$, and an estimation of a received symbol, $\hat{s}_j$, are obtained, an estimation of a transmitted bit stream may be obtained according to the bit-symbol mapping rules shown in Table 1.

Besides of the spatial modulation (SM) system described in the foregoing where each time only one link is used to transmit data, a generalized spatial modulation (GSM) system activates a subset of all links for each transmission, and uses an index of the subset as a carrier for information transmission. Different links may transmit same data so as to improve system reliability; or may transmit different data to improve system data rates. Herein, this is deemed as a form of spatial modulation.

As is seen from the foregoing description, though the multi-carrier SM technique only activates a subset which includes one or several links among all the links for each transmission, to achieve an accurate estimation of link index, the receiving end still needs to know channel state information of all the links. When the number of transmitting links is relatively large, to enable the receiving end to obtain accurate channel state information, reference signals used for downlink channel training will bring significant overheads, which affects achievable system frequency efficiency. Therefore, the SM technique brings challenges to system downlink physical channel training.

A traditional reference signal (RS) design in a radio communication system, e.g., cell specific RS (CRS) or channel state information reference signal (CSI-RS) in a long term evolution advanced (LTE-A) system, on different antennas, reference signals orthogonal to one another are transmitted, e.g., reference signals for channel estimation of respective links being transmitted on orthogonal time or frequency resources, or using a same time or frequency resource, but using orthogonal code sequences to differentiate different links, to ensure that reference signals used for channel estimation between different links do not interfere with one another. Therefore, the size of overheads of these reference signals is proportional to the number of links at the transmitting end. When the number of links is relatively large, using these traditional RS designs may cause a relatively large size of overheads, which leads to a decrease of system spectral efficiency. The problem of downlink physical channel reference signal overheads is a problem yet to be solved for a traditional multiple-input multiple-output (MIMO) system using spatial multiplexing. For a multi-carrier SM system, each data transmission only activates a part of links, and when data is transmitted, there are still a large number of links that are not used. How to use these links to reduce the overheads caused by downlink channel training is an issue addressed in the present disclosure.

To address this issue, a design for reducing RS overheads is proposed in accordance with the present disclosure to reduce the overheads caused by downlink channel training and to improve system spectral efficiency.

In an embodiment of the present disclosure, a downlink physical channel training design applicable for multi-carrier spatial modulation will be introduced, in combination with detailed settings of system parameters. In an embodiment of the present disclosure, a multi-carrier system using 256 sub-carriers and including 14 OFDM symbols is considered. Twelve contiguous sub-carriers on every 14 OFDM symbols constitute a physical resource block (PRB). The number of transmitting antennas of the system is N, which means that the number of frequency-domain equivalent channel links is N.

Figure 2:
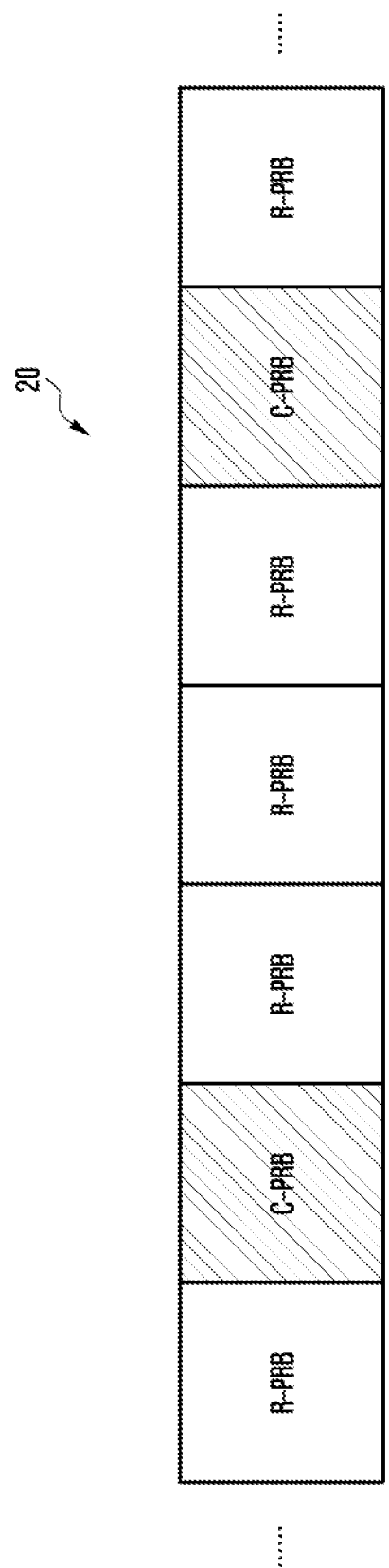
FIG. 2 is a schematic diagram of a system frame structure according to an embodiment of the present disclosure.

In the system, PRBs are categorized into two categories. The first category is conventional PRB (C-PRB), i.e., identical to PRBs in traditional standards, and corresponds to the first physical resource block in the claims. On a C-PRB, a traditional method may be used to estimate channel coefficients on different links, i.e., reference signals on different links using orthogonal time-frequency resources. The second category is reduced PRB (R-PRB, which may also be referred to as "simplified PRB"), and uses the method of the present disclosure which reduces the overheads of reference signals to transmit the reference signals. In this case, a system frame structure may be represented as that illustrated in FIG. 2. FIG. 2 is a schematic diagram 20 of a system frame structure according to an embodiment of the present disclosure. This case is equivalent to inserting at least one physical resource block for reducing the overheads of the reference signals between two adjacent traditional physical resource blocks, and transmitting the traditional physical resource blocks and the physical resource blocks for reducing the overheads of the reference signals.

Since a C-PRB uses orthogonal resources (including resources in a time domain, a frequency domain, a code domain, etc.) to transmit references signals of different links, thus a channel estimation on a C-PRB may be considered to be more accurate. Meanwhile, a R-PRB uses a method for transmitting reference signals with overheads being reduced, which provides a channel estimation result with lower accuracy and fewer overheads.

Figure 3:
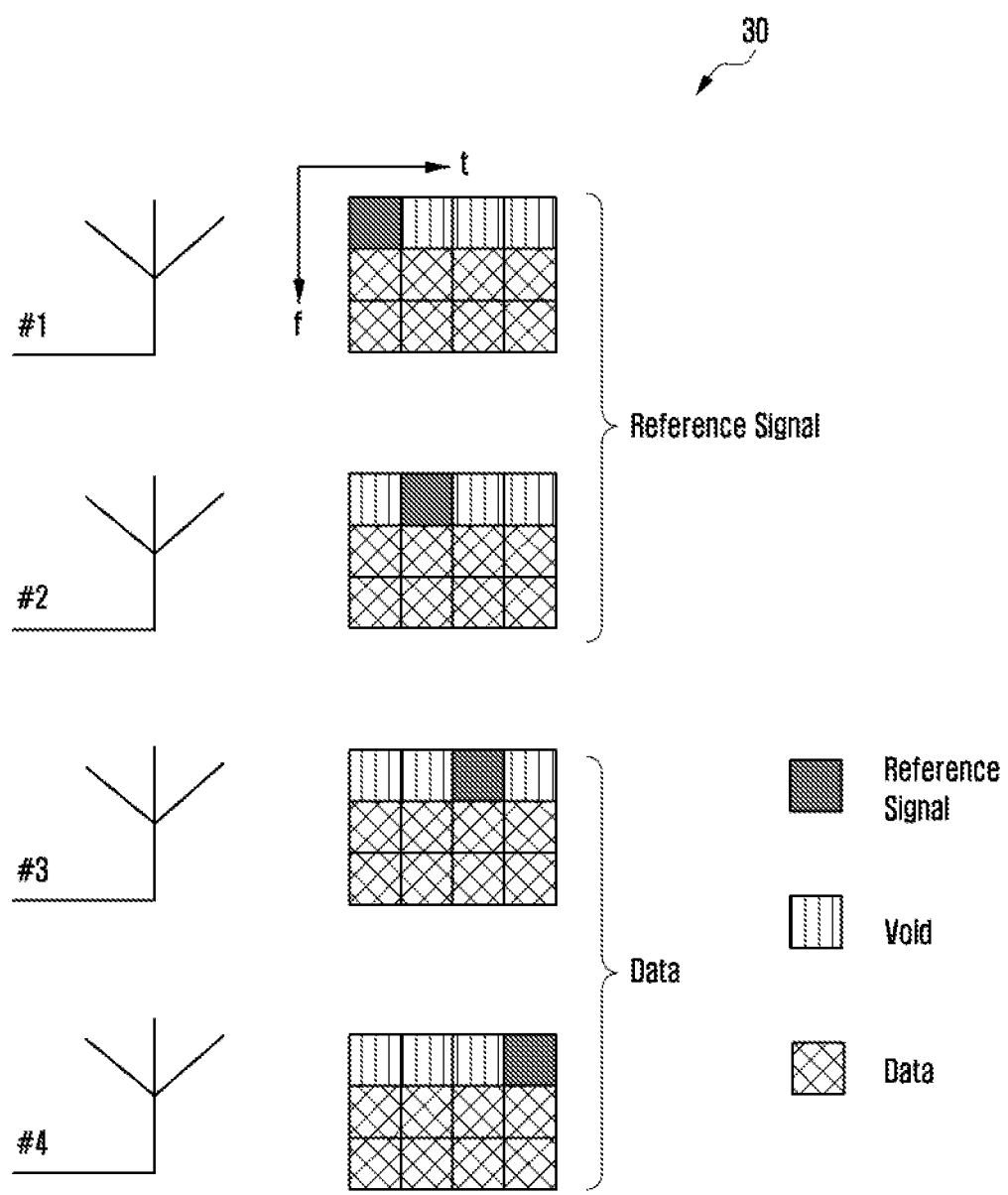
FIG. 3 is a schematic diagram of transmitting reference signals in conventional physical resource blocks (C-PRBs) according to the embodiment illustrated in FIG. 2.

To be specific, on a C-PRB, orthogonal time-frequency resources are used to transmit reference signals. Taking 4-link multi-carrier spatial modulation as an example, FIG. 3 is a schematic diagram 30 of a method for transmitting reference signals on a C-PRB according to the embodiment illustrated in FIG. 2. As illustrated in FIG. 3, to transmit reference signals for estimating channel state information of 4 links, at least four time-frequency resources need to be occupied. Although, in the example shown in FIG. 3, orthogonal time resources are used, orthogonal frequency resources may also be used to transmit the reference signals, or a same time or frequency resource may be used, but orthogonal code sequences orthogonal to one another and each having a length of 4 may be used to differentiate different links. In the present embodiment, the reference signals as shown in FIG. 3 are used for illustration purpose.

Figure 4:
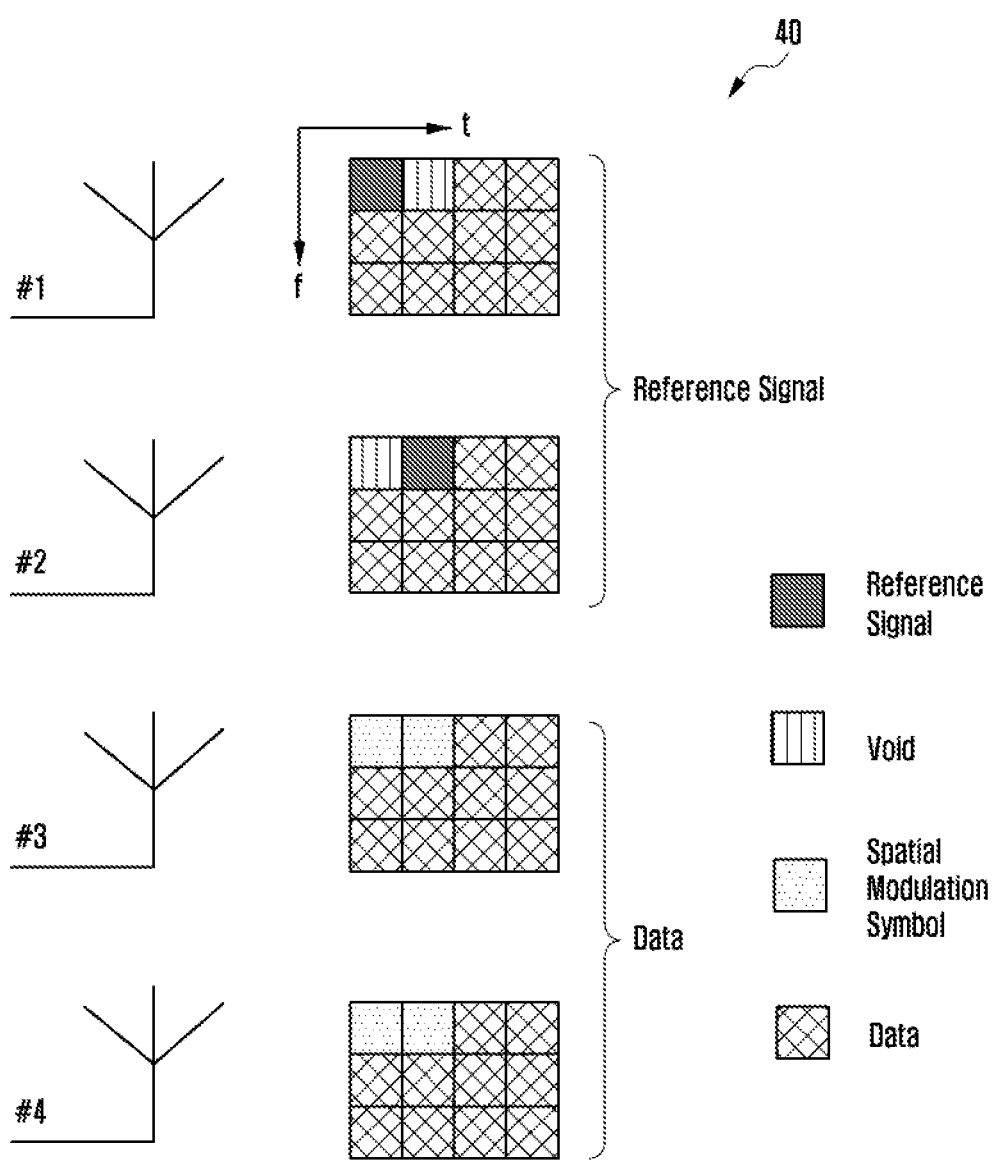
FIG. 4 is a schematic diagram of transmitting superimposed reference signals and data according to an embodiment of the present disclosure.

On a R-PRB, overheads of reference signals are reduced through superimposing data symbols and reference signals. A 4-link multi-carrier spatial modulation is shown in FIG. 4 as an example. FIG. 4 is a schematic diagram 40 illustrating R-PRBs corresponding to individual links according to an embodiment of the present disclosure. As can be seen from FIG. 4, time-frequency locations in black for links 1 and 2 are configured to transmit reference signals, and the reference signals are located in orthogonal time-frequency resources. For example, when link 1 is transmitting a reference signal, a corresponding time-frequency location on link 2 does not transmit any data, and when link 2 is transmitting a reference signal, a corresponding time-frequency location on link 1 does not transmit any data. Meanwhile, links 3 and 4 perform spatial modulation with the number of links being 2, and one of the links is selected to be activated and transmit corresponding symbol data according to a group of input bits.

As shown, this type of transmission method is equivalent to superimposing a reference signal and a data symbol in a space domain. This type of transmission method is different from a traditional reference signal transmission method. In this transmission method, a part of data can still be transmitted while physical channel training is being performed. Although the transmitted data rates are decreased a little, the overheads for training are also decreased. Still, taking the 4-link multi-carrier SM system shown in FIG. 4 as an example, assume that a modulation mode of the system is quadrature phase shift keying (QPSK). When no reference signal is transmitted, the data rate transmitted on each sub-carrier is 4 bps/Hz. when a reference signal is transmitted using a traditional method, data cannot be transmitted on a corresponding sub-carrier, and when the design of the present embodiment is used to transmit a reference signal, the data rate transmitted on a corresponding sub-carrier is 3 bps/Hz, and the overheads for transmission of the reference signals are reduced.

Figure 5:
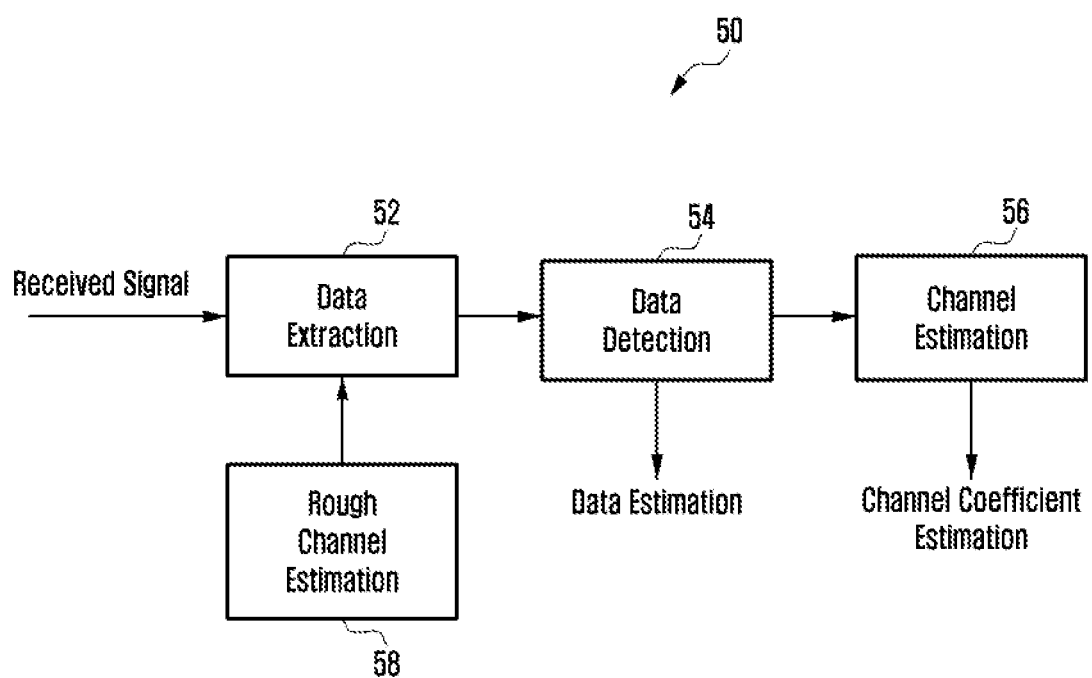
FIG. 5 is a schematic diagram of a structure of a receiving apparatus applicable for transmitting superimposed reference signals and data according to various embodiments of the present disclosure.

FIG. 5 is a possible structure of a receiving apparatus 50 applicable for transmitting superimposed reference signals and data according to various embodiments of the present disclosure. The receiving apparatus 50 includes a data extracting module 52, a data detecting module 54, and a channel estimation module 56.

The data extracting module 52 is configured to obtain a rough estimation (e.g., rough channel estimation 58) of a current channel based on a received signal and preceding N channel estimation results of first physical resource blocks or an interpolation result of channel estimations of first physical resource blocks in preceding and following N1 frames, and extract a spatial modulation (SM) symbol transmission part, where N is larger than or equal to 1, and N1 is larger than or equal to 1.

The data detecting module 54 is configured to perform spatial modulation detection for the obtained spatial modulation symbol transmission part extracted by the data extracting module 52, to obtain an estimation of a transmission link index and an estimation of a data symbol.

The channel estimation module 56 is configured to update a channel estimation of a corresponding link based on the estimation of the transmission link index and the estimation of the data symbol obtained by the data detecting module 54, a reference signal, and the received signal.

To be specific, assume that a spatial modulation mode in which a single link is activated for each transmission, and a reference signal transmission mode is transmitting reference signals for different links on orthogonal time-frequency resources. In this case, received signals at the receiving end of sub-carriers on R-PRBs that need to transmit reference signals may be represented as:

$$y = h_l s_l + h_m p + w$$

where vector $h_i$ represents an equivalent channel coefficient vector between transmitting link i and a receiving link;

$s_j$ is a data symbol transmitted;

p is a reference signal and is known to both the transmitting end and the receiving end; and w is a noise vector.

In the above expression, the first entry on the right is a spatial modulation (SM) vector, and the second entry is a reference signal used for channel estimation.

In the above equation, parameters that need to be estimated include a link index i in the spatial modulation (SM) vector, a data symbol $s_j$, and a channel vector that needs to be estimated $h_m$. However, since only the reference signal p and a SM vector set are known, it is difficult to detect all unknown numbers when traditional methods are used. In this case, some priori information may be needed to assist the detection. For example, for a channel which varies relatively slowly, a current channel may be predicted or estimated using channel estimations of previous PRBs to obtain a rough channel estimation $\hat{h}_m$, and extract data portion as follows:

$$\tilde{y} = y - \hat{h}_m p \approx h_i s_j + w$$

Afterwards, data detection is performed for the signal after the data is extracted to obtain a link index and a detected data symbol, $\hat{i}$ and $\hat{s}_j$. After data detection, an estimation of SM vector may be removed from the received signal to perform a channel estimation operation. That is:

$$\tilde{y} = y - h_i \hat{s}_j$$

A channel estimation is performed for the signal with assistance of reference signal p to obtain an estimation result $\tilde{h}_m$.

To obtain a rough channel estimation, $\hat{h}_m$, it is necessary for adjacent conventional PRBs (C-PRBs) to provide relatively accurate channel estimations. One possible method is to use C-PRBs of previous several frames to estimate a rough channel estimation of a current R-PRB, $\hat{h}_m$, or obtain the rough channel estimation of the current R-PRB, $\hat{h}_m$, using an interpolation method for channel estimation results of C-PRBs of several preceding and following frames. In addition, during the interpolation or prediction procedure, channel estimation results of adjacent R-PRBs may be used as references.

As is seen from the above process, the degree of accuracy of the data symbol detection and channel estimation depends on the degree of accuracy of the rough channel estimation. Therefore, for a channel which varies quickly or fast, C-PRBs may be inserted more frequently, to improve accuracy of rough channel estimation. For a channel that varies slowly, the frequency of inserting C-PRBs may be decreased, to reduce overheads of the reference signals and obtain higher spectral efficiency.

The present embodiment is configured for a situation where a set of links for transmitting reference signals are not overlapped with a set of links for transmitting spatial modulation (SM) symbols, and their union constitutes all the links. It is to be specified that the foregoing situation is an advantageous design of the present disclosure, and when the design of the present disclosure is used in practice, the union of the two subsets of links is not necessary to be all the links. For example, when adjacent links are highly correlated, all the links may be divided into three non-overlapped subsets, among which, two subsets of links which have lower correlation are used for transmission of reference signals and SM symbols, and the remaining one subset of links is not used for transmission of any signal. In addition, the method for reducing reference signal overheads and the frame structure used in the present embodiment are also suitable for transmission of traditional spatial multiplexing MIMO symbols. For example, in the frame structure 20 shown in FIG. 2, C-PRBs are used to transmit traditional spatial multiplexing MIMO symbols, while R-PRBs use the transmission method as shown in FIG. 4, in which the time-frequency resources used for transmitting the reference signals may use the design provided according to the present embodiment, and the remaining time-frequency resources may be used for transmission of traditional spatial multiplexing MIMO symbols.

In the present embodiment, a downlink physical channel training design suitable for multi-carrier spatial modulation (SM) will be introduced in combination with detailed settings of system parameters. The system parameters are same as those in the embodiment illustrated in FIGS. 2 and 3, and the system uses a frame structure 20 as shown in FIG. 2.

According to an embodiment of the present disclosure, C-PRBs use a method similar to a traditional reference signal design, and channel estimation for different links is performed using orthogonal time-frequency resources, as more accurate channel estimations, while R-PRBs use the reference signal transmission method with overheads being reduced.

Figure 6:
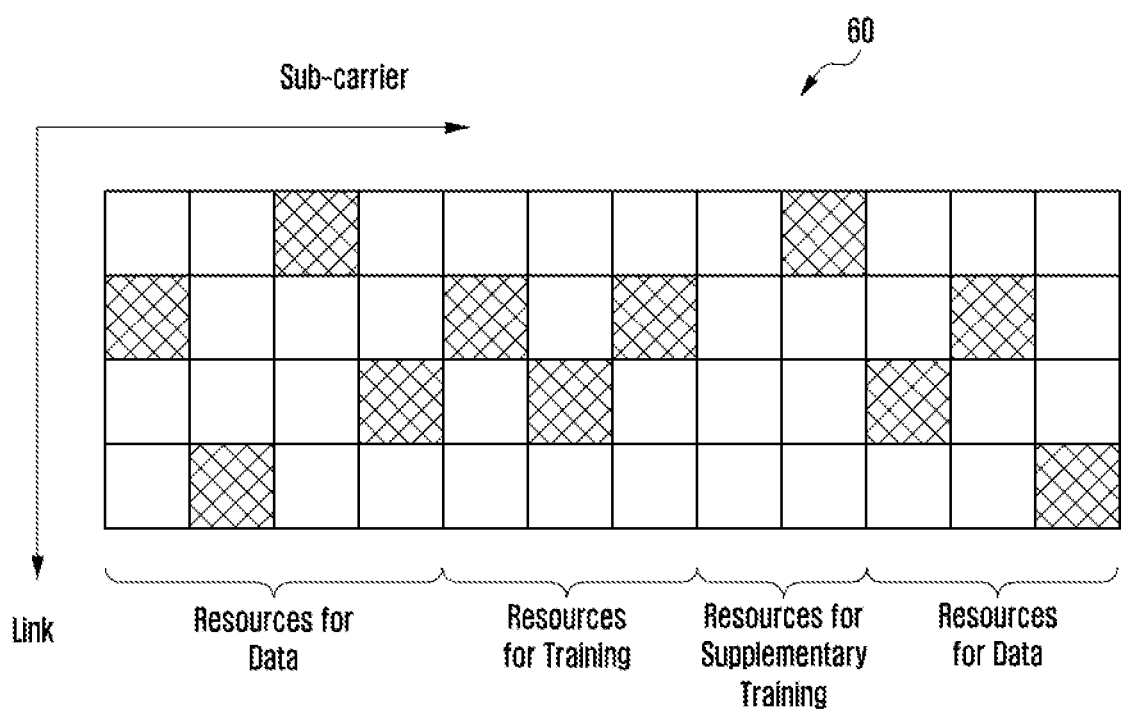
FIG. 6 is a schematic diagram of a method of using data symbols as supplementary reference signals according to an embodiment of the present disclosure.

FIG. 6 illustrates a schematic diagram 60 of a reference signal transmission method with overheads being reduced according to an embodiment of the present embodiment. In FIG. 6, the grid boxes represent data. The method does not transmit traditional reference signals, but uses data symbols as supplementary reference signals. Therefore, for a SM symbol, the portions which are not grid boxes are void.

Referring to FIG. 6, that which is transmitted by resources labeled as "resources for data" are normal SM symbols used for transmitting data that which is transmitted by resources labeled as "resources for training" are SM symbols used for channel training and data transmission, and that which is transmitted by resources labeled as "resources for supplementary training" are supplementary channel training measures used for preventing some links from not being estimated during a training stage or having poor channel estimation performance, and link indexes on these resources do not carry information, but only data symbols carry information.

In the method illustrated in FIG. 6, firstly, the transmitting apparatus divides a time-frequency resource block used for reducing reference signal overheads into two parts, then the transmitting apparatus uses a first part of time-frequency resources for channel estimation update and uses a second part of time-frequency resources for a supplementary of channel estimation update.

When the transmitting apparatus performs modulation and resource allocation, it records indexes of links, time-frequency resources of which are activated for training, and the number of times of using the links, and counts the number of times of being activated of each link after the training ends. When data is inserted for time-frequency resources for supplementary training, data symbols is inserted for a link, time-frequency resources of which have not been activated during the training or have been activated in less number of times, to ensure that channel state information of each link is updated. That is, the transmitting apparatus sorts the numbers of times of using links on the first part of time-frequency resources in an ascending order, and selects at least one link from the links to transmit the symbols on the second part of time-frequency resources according to an ascending order of the numbers of times of using the links.

With respect to transmission of a spatial modulation (SM) symbol, this reference signal transmission method may reduce overheads caused by channel training. Data used for training does not cause wastage of data rates, and meanwhile, data used for supplementary training only cause wastage of data carried by antennas.

Figure 7:
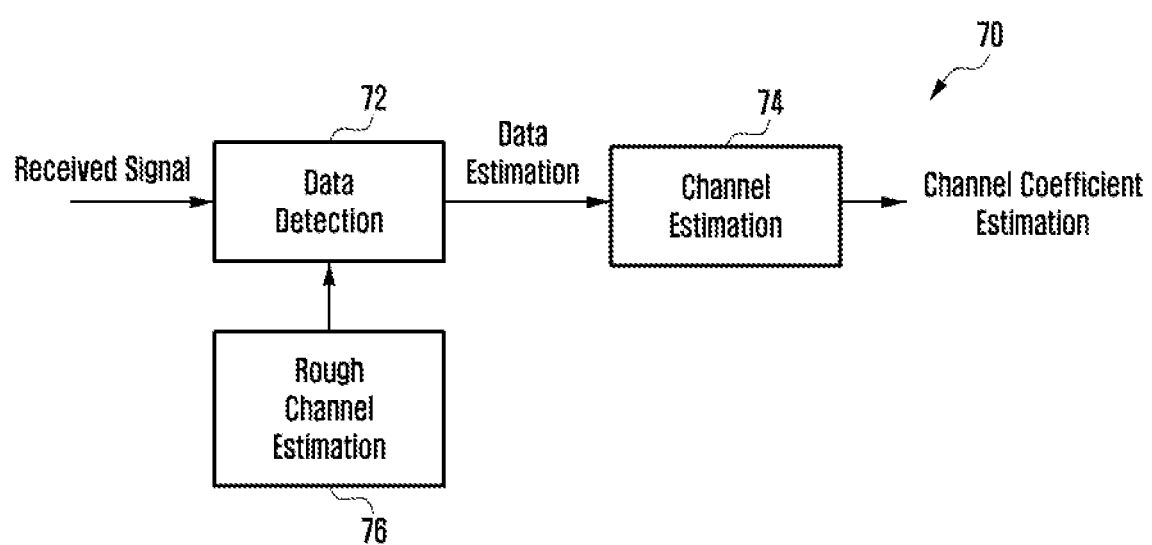
FIG. 7 is a schematic diagram of a structure of a receiving apparatus applicable for a transmission mode where data symbols are used as supplementary reference signals according to the embodiment illustrated in FIG. 6.

FIG. 7 is a schematic diagram 70 of a structure of a receiving apparatus applicable for a transmission mode where data symbols are used as supplementary reference signals according to the embodiment illustrated in FIG. 6. Channel estimation at the receiving apparatus shown in FIG. 7 may include the following steps or operations. First, data detection is performed for a received signal, by a data detection module 72, in which channel information used is a rough channel estimation 76 obtained based on preceding N (N is larger than or equal to 1) channel estimations of traditional physical resource blocks, or a rough channel estimation of a current frame obtained by interpolation of channel estimations of C-PRBs of preceding and following N1 frames (N1 is larger than or equal to 1), the channel estimations being performed by a channel estimation module 74, and after a data detection result is obtained, an estimated data symbol is deemed as a known reference signal to perform channel estimation, a channel coefficient of a transmitting link is estimated, and a channel estimation result of the link is updated.

To perform data detection, a rough channel estimation $\hat{h}_m$ is still needed. Similar to the embodiment illustrated in FIG. 2, to obtain a rough channel estimation, it is necessary for adjacent C-PRBs to provide relatively accurate channel estimations. One possible method is to use R-PRBs in previous several frames to predict a rough channel estimation of a current R-PRB, $\hat{h}_m$, or perform interpolation for channel estimation results obtained using C-PRBs in several preceding and following frames to obtain a rough channel estimation of a current R-PRB, $\hat{h}_m$. In addition, adjacent R-PRBs may be used as references to assist the prediction or the interpolation to obtain the rough channel estimation for the data detection.

It can be seen that in the present embodiment, the degree of accuracy of channel estimation still depends on the degree of accuracy of the rough channel estimation during the data detection. The more accurate the rough channel estimation is, the more accurate the data detection will be, and the more accurate the channel estimation update result will be. Or otherwise, if the rough channel estimation has a relatively large deviation, it may cause an error of the data detection, and further cause an error of the channel estimation result.

Similar to the embodiment illustrated in FIG. 2, when a channel varies relatively quickly or fast, a rough channel estimation used for data detection may have a relatively large error, and to ensure accuracy of the channel estimation, C-PRBs need to be inserted in a relatively high frequency, or otherwise, when a channel varies relatively slowly, a rough channel estimation used for data detection may have a relatively small error, and in this case, C-PRBs may be inserted in a relatively low frequency to reduce overheads of reference signals and to achieve higher spectral efficiency.

It is to be specified that, the frame structure shown in FIG. 2 is also suitable for the multi-antenna spatial multiplexing technique. That is, C-PRBs are transmitted using a traditional reference signal transmission method, and reference signals are transmitted on orthogonal resources, herein the resources referring to time resources, frequency resources, or orthogonal code sequence resources, but R-PRBs are transmitted using the reference signal transmission method which can reduce overheads, or using the reference signal insertion methods illustrated in the embodiment illustrated in FIG. 2 or the embodiment illustrated in FIG. 6.

For the design provided according to the present embodiment, in a C-PRB, reference signals are transmitted using orthogonal resources; but in a R-PRB, resources for transmitting common data, i.e., the part labeled as "resources for data" in FIG. 6 is used to transmit spatial multiplexing symbols. Resources for training, i.e., the parts labeled as "resources for training" and "resources for supplementary training" use the design provided in the present embodiment. That is, the spatial modulation technique may be used for reducing overheads of reference signals in a traditional MIMO system.

In the following, a simple example is used to illustrate how the design of the present disclosure can reduce overheads of downlink reference signals in a traditional spatial multiplexing MIMO system. Assume that both a transmitting apparatus and a receiving apparatus are configured with four antennas, and use QPSK modulation. In this case, each transmission of data portion can transfer 8 bits of information. If downlink reference signals are transmitted using a traditional method, i.e., reference signals corresponding to different links using orthogonal time-frequency resources, valid data cannot be transmitted over the time-frequency resources for transmitting reference signals. Assuming that the length of the reference signals is the number of links, i.e., 4, then in these 4 time-frequency resources, data rates are 0, and if the design shown in FIG. 6 is used in the present embodiment, then 5 time-frequency resources are used for downlink training, in which 3 time-frequency resources are used for training, and the other 2 time-frequency resources are used for supplementary training, and data symbols transmitted thereon use QPSK modulation as well. In this case, each time-frequency resource for training is able to transmit 4 bits of information, and totally 12 bits of information are transmitted, and each time-frequency resource for supplementary training may transmit 2 bits of information, and in total 4 bits of information are transmitted. That is, the design used in the present embodiment not only completes channel training on 5 time-frequency resources, but also transmits 16 bits of information. On a same time-frequency resource, if a traditional training method is used, only one time-frequency resource is used for data transmission to transmit 8 bits of information. It can be seen that through the design provided according to the present disclosure, overheads of reference signals of a traditional spatial multiplexing MIMO system may also be reduced significantly.

It is to be specified that when the number of receiving antennas is fewer than the number of transmitting antennas, the number of data streams that can be transmitted by a spatial multiplexing system is decided by the receiving antennas. For example, in the above example, if the receiving apparatus is only configured with two antennas, then the number of data streams transmitted each time is fewer, and only 4 bits may be transmitted on each time-frequency resource. In this case, the design provided herein can achieve a larger gain.

Figure 8:
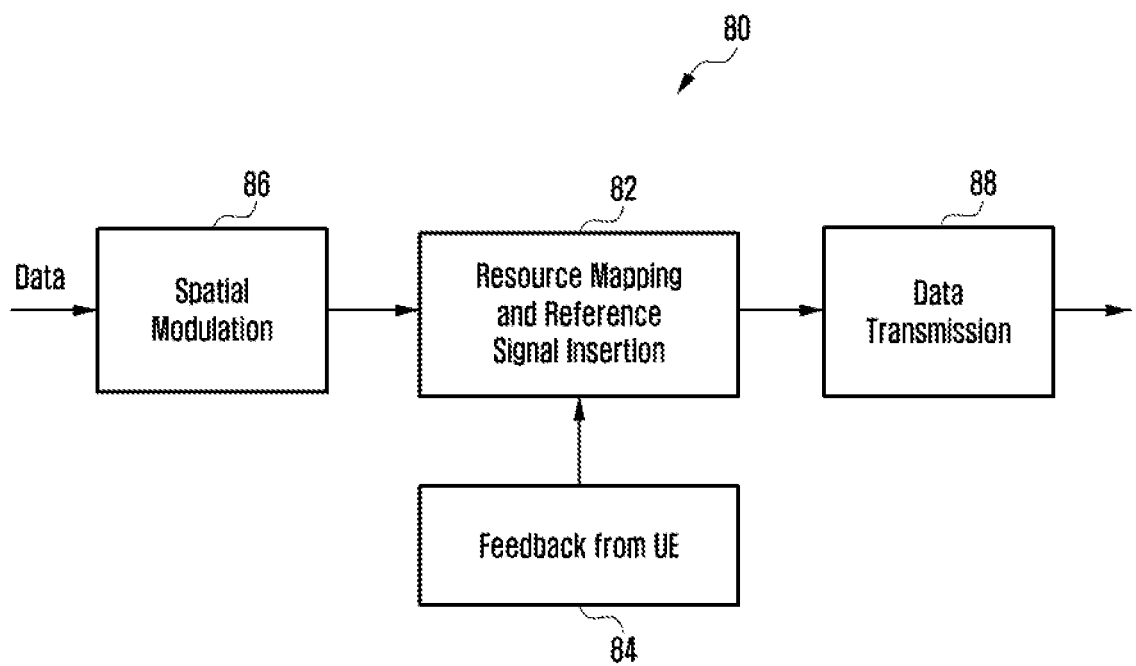
FIG. 8 is a schematic diagram of a design of self-adaptive resource mapping and reference signal insertion according to an embodiment of the present disclosure.

In the present embodiment, an implementation design of self-adaptively adjusting resource mapping and reference signal insertion according to channel state information fed back by UE is provided. A schematic diagram 80 of a design of self-adaptive resource mapping and reference signal insertion 82 according to the embodiment illustrated in FIG. 8 will be discussed.

As is seen from the foregoing two embodiments (illustrated in FIGS. 2 and 6), frequencies of inserting C-PRBs and R-PRBs are directly related to whether a channel varies fast or slowly. Based on this, an indication to control the frequencies of inserting the C-PRBs or the R-PRBs may be defined to control occurrence frequencies of these two kinds of PRBs. To be specific, after a channel estimation, the UE decides an indication according to whether the channel varies fast or slowly. If a channel varies relatively fast, C-PRBs need to be inserted in a relatively high frequency, but R-PRBs need to be inserted in a relatively low frequency to ensure accuracy of the channel estimation, and if the channel varies relatively slowly, C-PRBs may be inserted in a relatively low frequency, and R-PRBs may be inserted in a relatively high frequency. In this way, reference signal overheads used for channel estimation may be reduced, and system spectral efficiency may be improved. The UE feeds the indication back to the base station, and the base station decides the frequencies of inserting the C-PRBs and R-PRBs, and notifies a final result to the UE. The UE performs channel estimation and data detection for a channel based on the final result.

The design for reducing reference signal overheads may be adjusted according to channel state information fed back by the UE (i.e., feedback from UE 84). In the design for transmitting superimposed data and reference signals provided by the embodiment illustrated in FIG. 2, the number of links for transmitting spatial modulation symbols and the modulation order for transmitting data symbols may be adjusted according to channel state information. For example, when a channel varies relatively fast, relatively few links and a relatively low modulation order may be used for spatial modulation 86 to improve reliability of data detection, and further improve accuracy of channel estimation, or otherwise, more links and higher modulation order may be used to transmit more data (via data transmission 88) and to improve system spectral efficiency.

Similarly, in the design of using data symbols as supplementary reference signals provided according to the embodiment illustrated in FIG. 6, the modulation order of the data symbols and the number of sub-carriers for supplementary training can be dynamically adjusted according to channel state information fed back by the UE. To be specific, when a channel varies relatively fast, a modulation mode of a relatively low order and a relatively large number of supplementary training sub-carriers may be used to improve accuracy of the channel estimation, or otherwise, a modulation mode of a relatively high order and a relatively small number of supplementary training sub-carriers may be used to reduce overheads caused by channel training and to improve system spectral efficiency.

When the base station starts to perform data communication with the UE, the base station may send an initial reference location and a frequency of a C-PRB through signaling in a broadcast channel or in a downlink control channel. The UE may obtain the reference location and the frequency of the C-PRB by reading the broadcast channel or the downlink control channel, and further obtain a structure of C-PRBs and R-PRBs of the overall system to perform channel estimation and data communication. During data communication, the base station dynamically adjusts the frequency of the C-PRBs based on the channel estimation from the UE, and notifies the UE through the downlink control channel.

In an embodiment of the present disclosure, indication information fed back by UE is provided for aperiodic insertion of traditional PRBs.

The structure shown in FIG. 2 is a mode of periodically inserting C-PRBs and R-PRBs, applicable for scenarios where a channel varies relatively regularly. However, for some scenarios where a channel varies irregularly, the structure shown in FIG. 2 may experience a fast channel change during transmission of several consecutive R-PRBs, so that reliability of data detection and accuracy of channel estimation decrease, which leads to a decrease of system performance.

Figure 9:
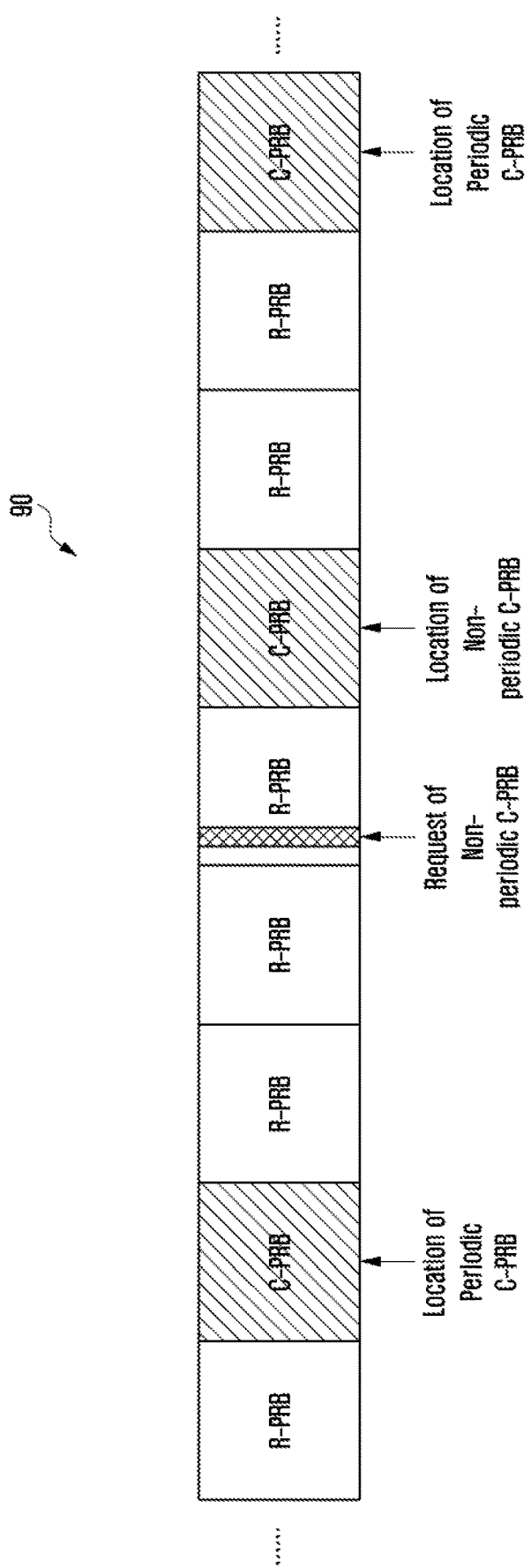
FIG. 9 is a schematic diagram of non-periodically inserting C-PRBs according to an embodiment of the present disclosure.

Thus, the present embodiment provides a method of aperiodic C-PRB insertion. FIG. 9 is a schematic diagram of non-periodically inserting C-PRBs according to an embodiment of the present disclosure. FIG. 9 shows a schematic diagram 90 of aperiodic C-PRB insertion. As shown in FIG. 9, two periodically inserted C-PRBs are spaced by multiple R-PRBs. Based on the discussion of the foregoing several embodiments, when a channel varies relatively slow, this kind of structure can achieve better bit error performance and relatively few reference signal overheads. However, when a channel varies unstably, e.g., a UE moving faster, or moving from an open area to a city, and channel state is largely changed, it is not enough to use the method of being spaced by multiple R-PRBs to meet the requirements of channel estimation accuracy. In this case, the UE may transmit an indication (or request) of inserting aperiodic C-PRBs to a base station through an uplink control channel. After the base station receives the indication (or request), it replaces one R-PRB with a C-PRB to enhance reliability of the downlink channel estimation. After the replacement with the C-PRB, in a downlink control channel, the base station can inform a UE of insertion of the C-PRB, or can specify that the UE may detect a C-PRB a predefined period of time after the indication (or request) of inserting aperiodic C-PRBs is transmitted.

By combining periodic C-PRB insertion and aperiodic C-PRB insertion, system flexibility can be enhanced, which improves the system ability against time-variant channels.

Figure 10:
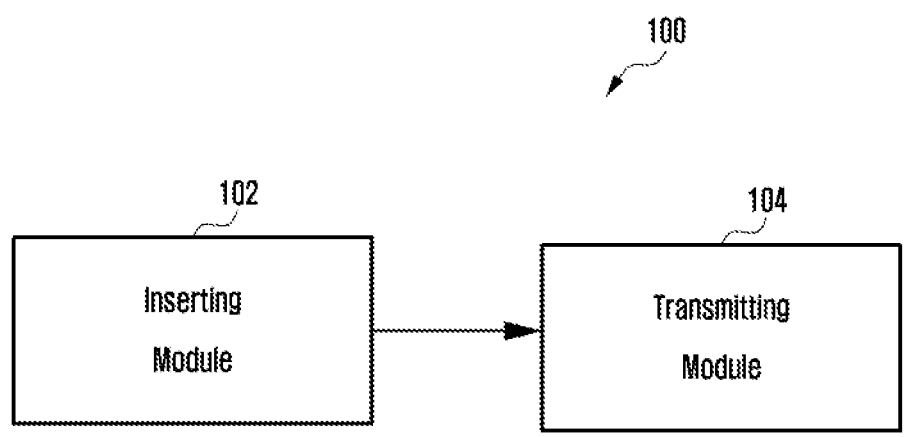
FIG. 10 is a schematic diagram of a structure of a transmitting apparatus according to an embodiment of the present disclosure.

Corresponding to the foregoing method, the present disclosure further provides a transmitting apparatus. FIG. 10 is a schematic diagram 100 of a structure of a transmitting apparatus according to an embodiment of the present disclosure. As shown in FIG. 10, the transmitting apparatus includes an inserting module 102 and a transmitting module 104.

The inserting module 102 is configured to insert at least one physical resource block for reducing reference signal overheads between adjacent first physical resource blocks.

The transmitting module 104 is configured to transmit the first physical resource blocks and the at least one physical resource block for reducing reference signal overheads.

Figure 11:
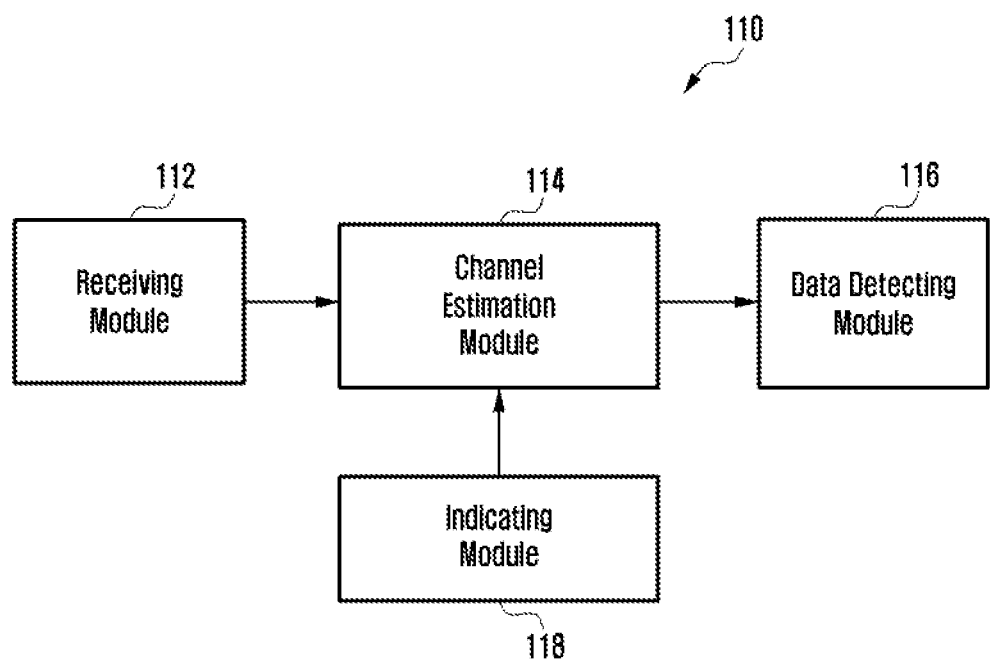
FIG. 11 is a schematic diagram of a structure of a receiving apparatus according to an embodiment of the present disclosure.

Corresponding to the method, the present disclosure further provides a receiving apparatus 110 as shown in FIG. 11. FIG. 11 is a schematic diagram of a structure of a receiving apparatus according to an embodiment of the present disclosure. The receiving apparatus includes a receiving module 112, a channel estimation module 114, and a data detecting module 116.

The receiving module 112 is configured to receive location information of first physical resource blocks and physical resource blocks for reducing reference signal overheads.

The channel estimation module 114 is configured to perform a channel estimation using the first physical resource blocks and the physical resource blocks for reducing the reference signal overheads received.

The data detecting module 116 is configured to perform data detection according to a channel estimation result.

The receiving apparatus 110 may further include an indicating module 118.

The indicating module 118 is configured to decide whether to transmit indication information of indicating insertion of a first physical resource block to a transmitting apparatus according to the channel estimation result.

Figure 12:
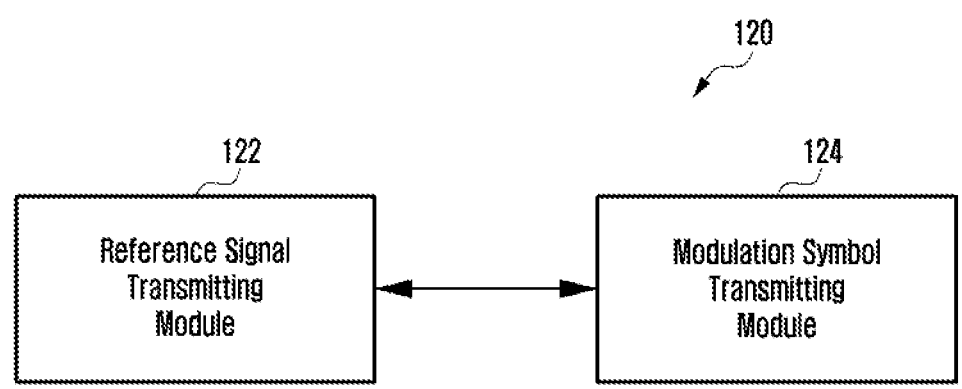
FIG. 12 is a schematic diagram of a structure of a transmitting apparatus according to an embodiment of the present disclosure.

Corresponding to the method, a transmitting apparatus is further provided according to the present disclosure. FIG. 12 is a schematic diagram of a structure of a transmitting apparatus 120 according to an embodiment of the present disclosure. As shown in FIG. 12, the transmitting apparatus 120 includes a reference signal transmitting module 122 and a modulation symbol transmitting module 124.

The reference signal transmitting module 122 is configured to transmit reference signals for a channel estimation on a first subset of links among transmission links.

The modulation symbol transmitting module 124 is configured to transmit spatial modulation symbols on a second subset of links among the transmission links.

The reference signal transmitting module 122 and the modulation symbol transmitting module 124 transmit the reference signals on a same time-frequency resource, in which the first subset of links includes at least one transmission link among all the transmission links, and the second subset of links includes at least one transmission link among all the transmission links.

Figure 13:
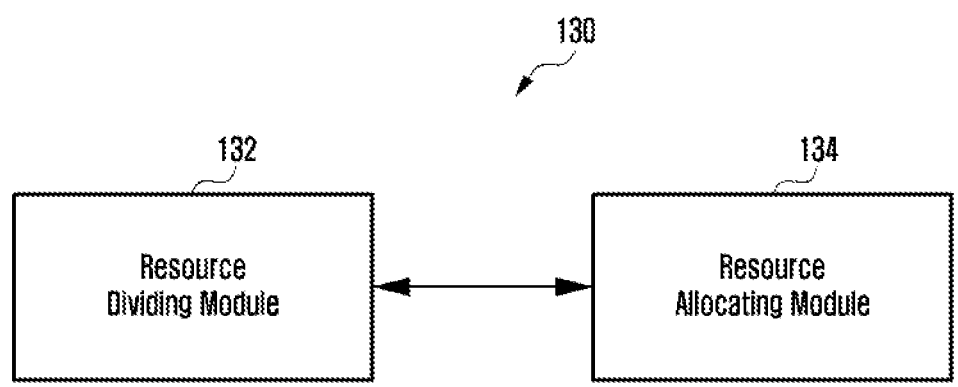
FIG. 13 is a schematic diagram of a structure of a transmitting apparatus according to an embodiment of the present disclosure.

Corresponding to the method, a transmitting apparatus is further provided according to the present disclosure. FIG. 13 is a schematic diagram of a structure of a transmitting apparatus 130 according to an embodiment of the present disclosure. As shown in FIG. 13, the transmitting apparatus 130 includes a resource dividing module 132 and a resource allocating module 134.

The resource dividing module 132 is configured to divide a time-frequency resource block specified for a channel estimation into two parts of time-frequency resources.

The resource allocating module 134 is configured to use a first part of time-frequency resources for channel estimation update, and use a second part of time-frequency resources for supplementary of channel estimation update.

While the present disclosure has been shown, and described with reference to various embodiments thereof, it will be understood by those skilled in the art that various changes in form and details may be made without departing from the scope and spirit of the present disclosure as defined by the appended claims and their equivalents.

What is claimed is:

1. A method for transmitting reference signals, comprising:
    inserting, by a transmitter, at least one reduced physical resource block (R-PRB) between conventional physical resource blocks (C-PRBs), wherein the C-PRBs do not include data symbols overlapped with reference signal symbols, wherein at least one data symbol and at least one reference signal symbol overlap in a space domain in the at least one R-PRB to thereby reduce reference signal overheads, wherein the at least one R-PRB is divided into two parts of time-frequency resources, wherein a first part of the time-frequency resources is used for a channel estimation update, wherein a second part of the time-frequency resources is used for a supplementary channel estimation update, and wherein the first part of the time-frequency resources and the second part of the time-frequency resources are not overlapped;
    counting, by the transmitter, a number of links used for transmitting the at least one data symbol on the first part of the time-frequency resources and a number of times of using the links;
    determining, by the transmitter, a set of links used for transmitting symbols on the second part of the time-frequency resources based on the counted number of the links and the counted numbers of the times of using the links; and
    transmitting, by the transmitter, the C-PRBs and the at least one R-PRB to a receiver,
    wherein reference signal symbols in the at least one R-PRB are transmitted on a first subset of links, the first subset including at least one link and excluding at least one link,
    wherein the at least one data symbol overlapped with the at least one reference signal symbol in the at least one R-PRB is transmitted on a second subset of links, the at least one link excluded from the first subset comprising the second subset of links such that the first subset and the second subset are mutually exclusive to each other,
    wherein a number of links included in the first subset and a number of links included in the second subset are determined based on channel state information received from the receiver, and
    wherein the channel state information indicates a channel variation.

2. The method of claim 1, further comprising:
    dividing, by the transmitter, the at least one R-PRB into the two parts of time-frequency resources,
    wherein the transmitting on the first subset of links and the transmitting on the second subset of links are carried out on a same time-frequency resource,
    wherein the first subset of links comprises at least one of the transmitting links,
    wherein the second subset of links comprises at least one of the transmitting links,
    wherein a first part of the time-frequency resources is used for the channel estimation update, and
    wherein a second part of the time-frequency resources is used for a supplementary of the channel estimation update.

3. The method of claim 1, wherein the method further comprises at least one of:
    transmitting, by the transmitter, preset locations of the C-PRBs and an insertion frequency for inserting the at least one R-PRB to the receiver, or
    transmitting, by the transmitter, locations of the C-PRBs and locations of the at least one R-PRB to the receiver.

4. The method of claim 1, wherein the method further comprises at least one of:
    determining an insertion frequency of inserting the at least one R-PRB according to the channel state information;
    receiving indication information of indicating insertion of a C-PRB from the receiver;
    inserting the C-PRB between the at least one R-PRB;
    transmitting notification information to the receiver; or
    inserting the C-PRB between a pair of the at least one R-PRB at a preset time interval.

5. The method of claim 4,
    wherein the determining of the insertion frequency of inserting the at least one R-PRB according to the channel state information comprises:
        in response to determining that a channel varies faster than a preset first threshold, using a first insertion frequency to insert the at least one R-PRB, and in response to determining that the channel varies slower than a preset second threshold, using a second insertion frequency to insert the at least one R-PRB, and wherein the first insertion frequency is less than or equal to the second insertion frequency.

6. The method of claim 1, wherein the reference signal symbols in the at least one R-PRB transmitted on the first subset of links and the at least one data symbol transmitted on the second subset of links are carried out on a same time-frequency resource, wherein the first subset of links comprises at least one of the transmitting links, and wherein the second subset of links comprises at least one of the transmitting links.

7. The method of claim 6, wherein the first subset of links and the second subset of links are not overlapped, wherein the transmitter is configured to use orthogonal resources to transmit the reference signal symbols in the at least one R-PRB on the first subset of links, and wherein the orthogonal resources comprise at least one of:
time resources,
frequency resources, or
orthogonal code sequence resources.

8. The method of claim 7, further comprising:

determining, by the transmitter, numbers of links contained in the first subset of links and in the second subset of links;

determining that a channel varies faster than a preset first threshold, and in response thereof, the first subset of links and the second subset of links are configured to have a first link number; and determining that the channel varies slower than a preset second threshold, and in response thereof, the first subset of links and the second subset of links are configured to have a second link number, wherein the first link number is smaller than the second link number.

9. The method of claim 1, further comprising:

sorting, by the transmitter, the number of times of using links of the first subset and second subset on the first part of the time-frequency resources in an ascending order; and selecting, by the transmitter, at least one link to transmit symbols on the second part of the time-frequency resources according to the ascending order of the number of the times of using the links of the first subset and second subset, wherein the transmitter only transmits the data symbols on the first part of the time-frequency resources.

10. The method of claim 1, further comprising:

determining, by the transmitter, a size of the second part of the time-frequency resources based on the channel state information fed back by the receiver, and informing the receiver of the size, wherein, in response to determining that a channel varies faster than a preset first threshold, the second part of the time-frequency resources is configured to use a first value, wherein, in response to determining that the channel varies slower than a preset second threshold, the second part of the time-frequency resources is configured to use a second value, and wherein the first value is larger than the second value.

11. A transmitting apparatus, comprising:
a transmitter; and
a processor, wherein the processor is configured to insert at least one reduced physical resource block (R-PRB) between conventional physical resource blocks (C-PRBs), wherein the C-PRBs do not include data symbols overlapped with reference signal symbols, wherein at least one data symbol and at least one reference signal symbol overlap in a space domain in the at least one R-PRB to thereby reduce reference signal overheads, wherein the at least one R-PRB is divided into two parts of time-frequency resources, wherein a first part of the time-frequency resources is used for a channel estimation update, wherein a second part of the time-frequency resources is used for a supplementary channel estimation update, and wherein the first part of the time-frequency resources and the second part of the time-frequency resources are not overlapped, wherein the transmitter is configured to count a number of links used for transmitting the at least one data symbol on the first part of the time-frequency resources and a number of times of using the links, wherein the transmitter is configured to determine a set of links used for transmitting symbols on the second part of the time-frequency resources based on the counted number of the links and the counted numbers of the times of using the links, wherein the transmitter is configured to transmit the C-PRBs and the at least one R-PRB, wherein reference signal symbols in the at least one R-PRB are transmitted on a first subset of links, the first subset including at least one link and excluding at least one link, wherein the at least one data symbol overlapped with the at least one reference signal symbol in the at least one R-PRB is transmitted on a second subset of links, the at least one link excluded from the first subset comprising the second subset of links such that the first subset and the second subset are mutually exclusive to each other, wherein a number of links included in the first subset and a number of links included in the second subset are determined based on channel state information received from the receiver, and wherein the channel state information indicates a channel variation.

12. The transmitting apparatus of claim 11, further comprising:

a reference signal transmitter; and a modulation symbol transmitter coupled with the reference signal transmitter, wherein the reference signal transmitter is configured to transmit the reference signal symbols in the at least one R-PRB for a channel estimation on the first subset of links among transmission links, wherein the modulation symbol transmitter is configured to transmit the at least one data symbol on the second subset of links among the transmission links, wherein the reference signal transmitter and the modulation symbol transmitter are configured to transmit the reference signal symbol and the at least one data symbol on a same time-frequency resource, and wherein the first subset of links comprises at least one of the transmitting links and the second subset of links comprises at least one of the transmitting links.

* * * * *